July 21, 1964     J. P. MEDLOCK     3,141,579
LIQUID MEASURING DISPENSERS
Filed Oct. 12, 1960     3 Sheets-Sheet 1
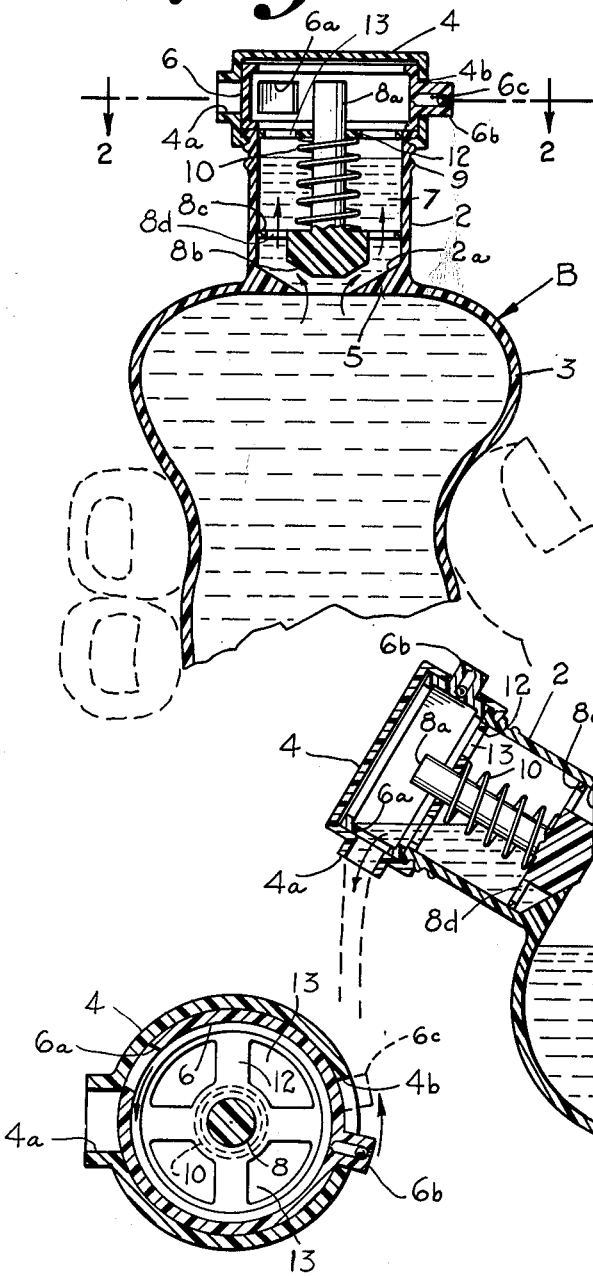
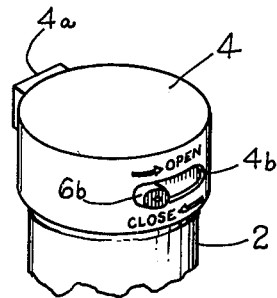
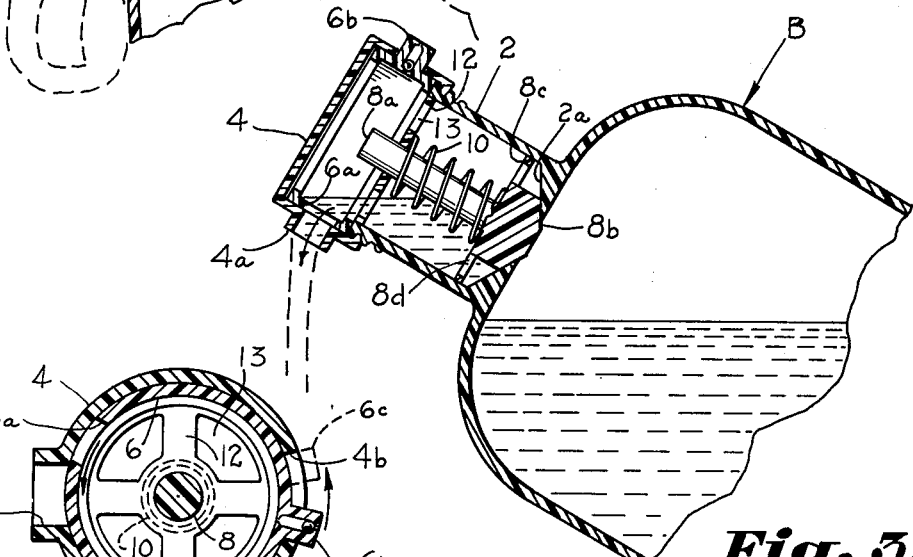
INVENTOR.
JOHN P. MEDLOCK
BY
Diggins & LeBlanc
ATTORNEYS July 21, 1964  J. P. MEDLOCK  3,141,579
LIQUID MEASURING DISPENSERS
Filed Oct. 12, 1960  3 Sheets-Sheet 2
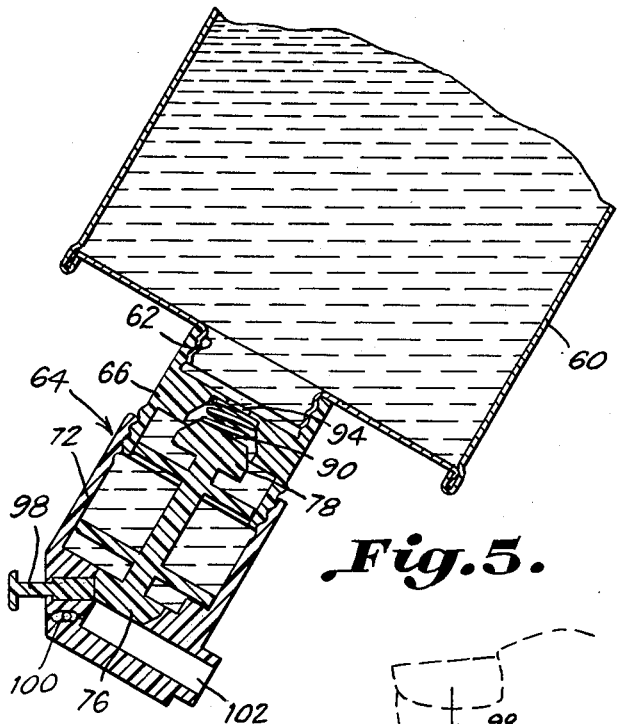
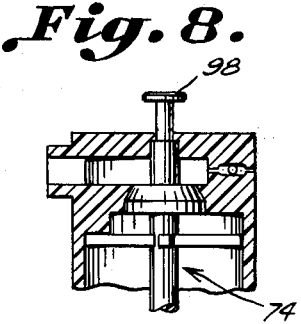
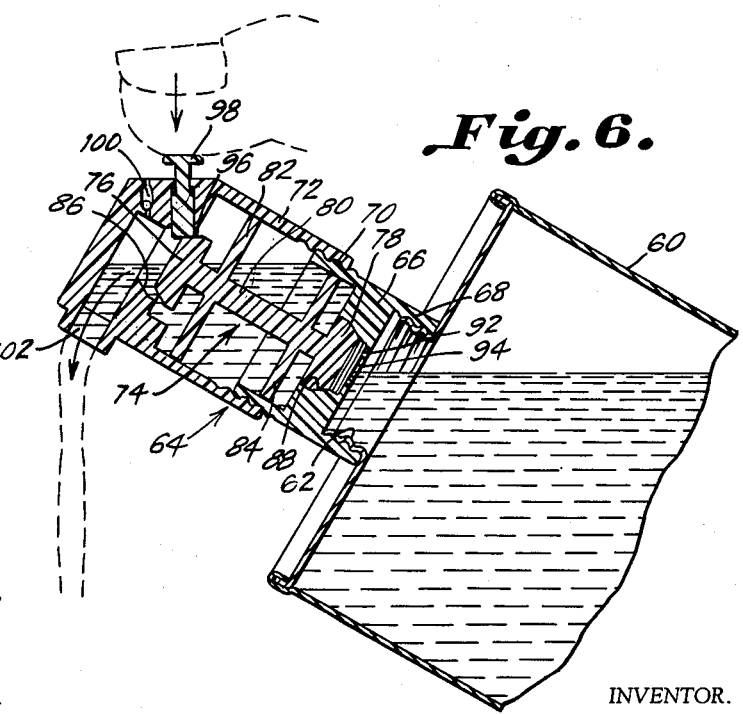
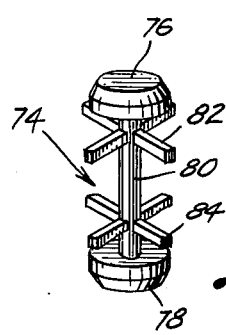
INVENTOR.
JOHN P. MEDLOCK
BY Diggins & LeBlanc
ATTORNEYS July 21, 1964 J. P. MEDLOCK 3,141,579
LIQUID MEASURING DISPENSERS
Filed Oct. 12, 1960 3 Sheets-Sheet 3

INVENTOR
JOHN P. MEDLOCK,
BY Diggins + Le Blanc
ATTORNEYS

United States Patent Office

3,141,579
Patented July 21, 1964

3,141,579
LIQUID MEASURING DISPENSERS
John P. Medlock, Rte. 2, Taylors, S.C.
Filed Oct. 12, 1960, Ser. No. 62,173
4 Claims. (Cl. 222—207)

The present invention relates to liquid measuring dispensers and, more particularly, to liquid measuring dispensers of improved and simplified construction.

In the past, a great number and variety of liquid measuring devices have been put on the market, many of these having been particularly designed for use in dispensing liquids such as detergents, hand lotions, and the like. Most of the devices of this nature with which applicant is familiar, however, have suffered from various disadvantages, primarily due to their complexity and high fabrication cost. In view of this fact, none has proven to be entirely satisfactory from a practical standpoint.

It is the primary object of the present invention to provide a liquid measuring dispenser which is not only inexpensive to manufacture, but whose construction is simplified and which is extremely effective for its intended purpose.

It is another principal object of the present invention to provide a liquid measuring dispenser which is capable of dispensing a predetermined fixed quantity of liquid regardless of the quantity of liquid remaining in the container with which the dispenser is utilized.

A further object of the present invention is to provide a liquid measuring dispenser which is adapted to fit standard liquid containers.

It is still another object of the present invention to provide a liquid measuring dispenser in which the measuring compartment of the dispenser can be pre-filled with a measured quantity of liquid and dispensed at a substantially later time.

It is a further object of the present invention to provide a liquid measuring dispenser in which a predetermined quantity of liquid can be dispensed repeatedly once the dispenser is inverted without returning the dispenser to its upright position after the discharge of each measured quantity of liquid.

It is another object of the present invention to provide a liquid measuring dispenser usable in connection with a flexible liquid container in which a measured quantity of liquid may be stored in a measuring compartment associated with the flexible container merely by compression of the container.

These and further objects and advantages of the present invention will become more apparent upon reference to the following specification and claims and appended drawings wherein:

FIGURE 1 represents a partial cross-sectional view of one form of device made in accordance with the instant invention, showing the flexible body of the device in its compressed condition;

FIGURE 2 represents a transverse section taken along line 2—2 of FIGURE 1;

FIGURE 3 represents a partial cross-sectional view of the device illustrated in FIGURES 1 and 2, showing liquid being dispensed from the device;

FIGURE 4 illustrates a perspective view of the outside of the dispensing mechanism in the device shown in FIGURES 1–3;

FIGURE 5 is a partial cross-sectional view of another form of the invention, showing a liquid measuring dispenser having rigid side walls and with the dispenser in non-dispensing position;

FIGURE 6 is a partial cross-sectional view of the device show in FIGURE 5, showing the dispensing elements in dispensing position;

FIGURE 7 is a perspective view of a double-acting piston sub-assembly forming a component of the dispenser illustrated in FIGURES 5 and 6;

FIGURE 8 is a partial cross-sectional view illustrating a modified form of the actuating mechanism of the dispenser shown in FIGURES 5–7;

Figure 9:
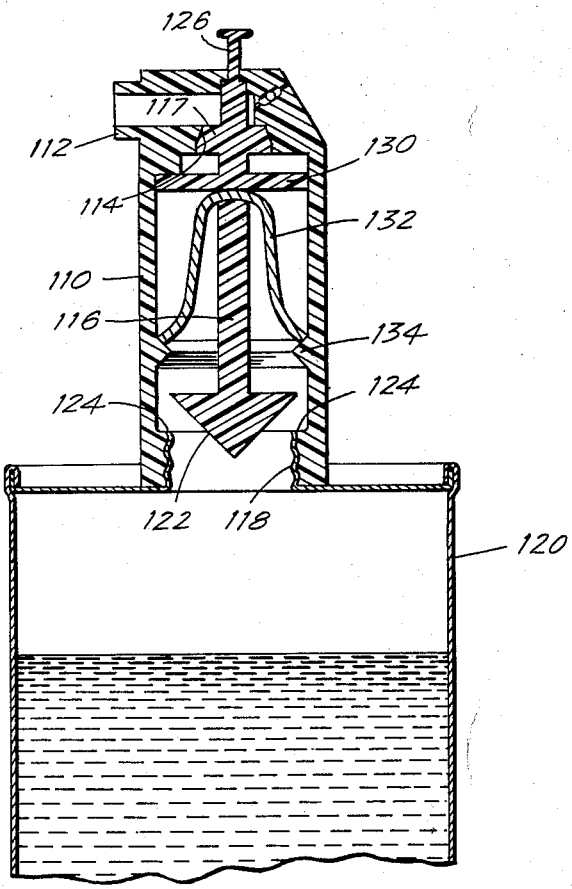
FIGURE 9 is a partial cross-sectional view of a modified form of the dispenser shown in FIGURES 5–7.

As shown in FIGURES 1–4, one form of the dispensing mechanism of the present invention generally comprises a liquid receptacle or bottle indicated generally at B and having a container portion 3 and a reduced diameter neck portion 2 integrally formed therewith. As shown in the drawings, receptacle B is formed of a flexible material permitting flexure of the walls of container portion 3, which may suitably be any of the currently used plastic materials which are available. Container portion 3 and neck portion 2 are provided at their juncture with a radially inwardly projecting annular flange 5 having a sloping upper surface 2a for a purpose to be presently described. As will be apparent, flange 5 serves to divide receptacle B into two separate units: a container portion 3 for the storage of liquid and a compartment 7 for measuring liquid to be dispensed.

As may be seen in FIGURES 1–4, neck 2 is threaded at 9 for engagement by a cap 4 which, in turn, is provided with a spout 4a through which liquid may be dispensed and a horizontal slot 4b. Mounted within cap 4 is an annulus 6 having a port 6a and a lug 6b, the latter of which projects outwardly through slot 4b in cap 4. As is apparent, port 6a is located in annulus 6 so as to be alignable with spout 4a in cap 4 when lug 6b is moved to one end of slot 4b. Lug 6b is provided with a conventional ball-type air valve 6c to permit ingress and egress of air during the operation of the device of the present invention.

Fixedly mounted within and near the end of compartment 7 is a guide ring 12 having a central aperture 8 and four uniformly spaced ports 13 to permit the passage of liquid from compartment 7 to spout 4a. Slidably mounted for longitudinal movement within central aperture 8 of guide ring 12 is a piston or plunger 8a having a head 8b tapered to conform to the taper 2a of flange 5. As may be seen, a second guide ring 8c is secured to the upper portion of head 8b so as to guide plunger 8a in its movement within compartment 7. As indicated in FIGURES 1 and 3, guide ring 8c is provided with through-ports 8d, similar to apertures 13 in guide ring 12, to permit the passage of liquid from one side to the other of guide ring 8c. Plunger 8a is normally resiliently seated against the tapered upper surface 2a of flange 5 by means of a spring 10, one end of which is in contact with the bottom surface of guide ring 12, the other end of which seats against the upper surface of head 8b of plunger 8a.

When dispenser B is in non-dispensing condition, container portion 3 will contain liquid but compartment 7 will be liquid-free. Lug 6b will be positioned at the end of slot 4b in cap 4 which will place port 6a out of alignment with spout 4a. When it is desired to isolate a measured quantity of liquid, pressure is applied to the flexible side walls of container portion 3 as shown in FIGURE 1. Liquid displaced by the application of pressure as described will overcome the spring bias of spring 10 and unseat head 8b of plunger 8a, permitting liquid to pass from container portion 3 into compartment 7. Liquid will continue to flow into compartment 7 until the compartment is filled, valve 6c permitting egress of liquid-displaced air without, at the same time, permitting liquid to escape from compartment 7. Since port 6a is out of alignment with spout 4a no liquid will escape through the spout during this operation. Removal of pressure from the side walls of the dispenser will permit plunger 8a to reseat itself, under the bias of spring 10, against flange 5.

When it is desired to dispense the liquid from compartment 7, the dispenser is tipped forward, as shown in FIGURE 3, lug 6b is moved to the opposite end of slot 4b to align port 6a with spout 4a and the liquid will be dispensed from the latter. As will be apparent, air valve 6c will permit ingress of air into compartment 7 to displace liquid as it discharges through spout 4a to permit more uniform flow from the dispenser.

When container portion 3 is filled with liquid, it will not be necessary to tip the dispenser in order to fill compartment 7 with liquid. As the supply of liquid in the container portion is depleted, however, it will be necessary to slightly tip the dispenser in order to perform the measuring operation. As will be apparent, it is not necessary to discharge the liquid which has been forced into compartment 7 immediately after the compartment-filling step, since the liquid in compartment 7 will remain secure for an indefinite period of time until it is desired to dispense the liquid from it.

FIGURES 5–7 illustrate a second form of dispenser within the inventive disclosure of the instant application. While the operation of this dispenser is similar in many respects to that of the dispenser of FIGURES 1–4, this dispenser is primarily usable with rigid-walled receptacles rather than with the flexible-walled container of the dispenser described above. As shown in the drawings, the second form of dispenser comprises a rigid-walled container 60 having a threaded neck portion 62 by means of which a measuring compartment indicated generally at 64 is secured in place. Measuring compartment 64 comprises a main body section 72 and an adapter section 66, the latter being internally threaded at 68 for threaded engagement with the threaded neck portion 62 of container 60 and externally threaded at 70 for threaded engagement with main body section 72.

Mounted for longitudinal sliding movement within main body section 72 and adapter 66 is a double-acting plunger or piston indicated generally at 74 comprising heads 76 and 78 secured to the ends of a shaft 80, with two sets of radially projecting guide bars 82 and 84 positioned on shaft 80 intermediate heads 76 and 78. As may be seen in FIGURES 5 and 6, guide bars 84 are shorter than guide bars 82 so that the former may engage the inner walls of the lesser diameter adapter portion 66.

The outer surface portions of heads 76 and 78 conform to the respective seating surfaces 86 and 88 located in main body section 72 and adapter section 66, respectively, so that one or the other of the heads will be in sealing engagement with its respective seating surface depending upon the position of piston 74. Head 76 is normally biased into seating engagement with seating surface 86 (as shown in FIGURE 5) by means of a spring 90 seated on a radially inwardly projecting flange 92 formed integrally with adapter section 66. As is apparent, a port 94 is formed within the annulus formed by flange 92 to establish communication between container 60 and measuring compartment 64.

Slidably mounted for engagement with the sloping seating surface 96 of piston head 76 is an actuating button 98, as shown in FIGURES 5 and 6. As may be seen, depression of button 98 as shown in FIGURE 6 will result in downward movement of piston 74 in the direction of container 60. Main body section 72 is also provided with a ball-type air valve 100 and a discharge spout 102, the latter being sealed off from communication with the central portion of measuring compartment 64 by means of the seal afforded by engagement of piston head 76 with seating surface 86.

Since piston 74 is normally spring biased into the position shown in FIGURE 5, inversion of the dispenser will cause liquid to flow from container 60 into measuring compartment 64 through port 94. When button 98 is depressed with the dispenser still in its inverted position, the liquid in measuring compartment 64 will flow out of spout 102 and further egress of liquid from container 60 into measuring compartment 64 will be prevented through the seal effected by the seating of piston head 78 with seating surface 88, as shown in FIGURE 6. When measuring compartment 64 has been emptied of its contents, pressure on button 98 may be released, permitting piston head 76 to return to its normal position, seated against seating surface 86 as shown in FIGURE 5, and further flow of liquid through spout 102 will thus be prevented. As will be apparent, free flow of liquid through spout 102 will be assured by virtue of the presence of air valve 100.

A modified form of the structure shown in FIGURES 5–7 is shown in FIGURE 8. This structure is substantially identical to the first rigid-walled structure shown, except that button 98 is coaxial with piston 74 so as to permit the application of pressure at the end of the piston rather than at a sloping seating surface. In other respects, the operation of the apparatus is identical to that described in connection with the structure of FIGURES 5–7.

A modified form of the structure shown in FIGURES 5–7 is shown in FIGURE 9. This modification is similar to that illustrated in FIGURES 5–7 in that the dispenser is adapted to be used in connection with a rigid-walled receptacle and in that the operation of the two dispensers is substantially identical. It differs from the former embodiment, however, in its substitution of a one-piece measuring compartment for the two-piece compartment of FIGURES 5–7 and in the nature of the construction of the biasing means to maintain the double-acting piston in its non-dispensing position.

Thus, as illustrated in FIGURE 9, a unitary measuring compartment 110 having a spout 112 and a valve seat 114 is threaded onto the neck 118 of a rigid-walled container 120. A double-acting piston 116, mounted for sliding movement within compartment 110, has a first piston head 117 normally in engagement with valve seat 114 and a second piston head 122 adapted to engage the top 124 of neck 118 upon downward movement of the piston through depression of actuating button 126 whose lower end bears against the top of piston head 117.

Piston 116 is provided with an upper set of guide bars 130 corresponding to guide bars 82 of the piston in the embodiment of FIGURES 5–7 but has no guide bars corresponding to guide bars 84 of that embodiment. In lieu thereof, piston 116 is provided with a spider-type spring 132 which serves not only to bias piston head 117 into engagement with valve seat 114 in the normal, non-dispensing position of piston 116, but, as well, to stabilize the piston within measuring compartment 110. As is clearly shown in FIGURE 9, spring 132 has a cross-section generally in the form of an inverted U with its base fixed to the piston immediately below guide bars 130 and the extreme ends of its legs held in position in measuring compartment 110 by means of a radially inwardly extending annular flange 134.

As previously indicated, the operation of the dispenser of FIGURE 9 is identical to that of the dispenser of FIGURES 5–7.

Figure 10:
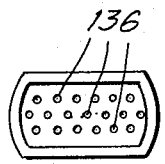
FIGURE 10 illustrates a form of spout cap which may be used in conjunction with the several dispensers of the present invention to adapt them for special uses.

If desired, the spouts of each of the dispensers previously described may be provided with a cap such as that shown in FIG. 10, which is provided with a plurality of small openings 136 to permit the dispenser to be used as a clothes sprinkler or the like if this is desired.

Both the flexible and rigid-walled dispensers of the present invention provide numerous advantages over prior art dispensers. Both dispensers are extremely simple in construction, contain relatively few moving parts and may be inexpensively manufactured. Due to the nature of the constructions involved, all parts may be fabricated of non-corrodible plastic, flexible in the case of the dispenser illustrated in FIGURES 1–4, rigid in the case of the dispenser illustrated in FIGURES 5–7, with only the spring in each of the dispensers being preferably constructed of a metallic material. If desired, of course, the spring may also be constructed of plastic. The measuring compartments of each of the structures may be so designed to permit its use on conventional containers presently being marketed or, if desired, either or both may be fabricated integrally with the main container section to form a unitary structure, as desired.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for dispensing a measured quantity of liquid comprising: a liquid storage container having flexible walls; said storage container having an opening therein; a dispensing mechanism secured to said opening in said storage container for dispensing a measured quantity of liquid; said dispensing mechanism comprising a neck portion; tapered annular flange means projecting inwardly from said neck portion at the junction of said dispensing mechanism and said storage container; valve means normally biased against said tapered annular flange for forming a liquid tight seal between said storage container and said dispensing mechanism; said valve means being positioned relative to said annular flange so that the application of inward pressure to said flexible walls of said container will force said valve means away from said annular flange through the application of liquid pressure against the former, whereby a measured quantity of liquid from said container may be forced into said dispensing mechanism; rotatable valve means located in said dispensing mechanism for permitting said measured quantity of liquid in said mechanism to be dispensed therefrom said rotatable valve means comprising a cap secured to the top of said dispensing mechanism, said cap having an opening therein, an annulus having an opening mounted within said cap, a lug secured to said annulus and projecting through said cap for rotating said annulus so that said openings are aligned thereby permitting liquid in said mechanism to be dispensed therefrom, and air valve means mounted within said lug to permit ingress and egress of air during the operation of said mechanism.

2. Apparatus as defined in claim 1 wherein said valve means comprises a guide plunger having a head portion; said head portion normally biased by said spring against said annular flange; said guide plunger being maintained in position along a fixed axis through its range of movement by means of first and second guide ring means.

3. Apparatus for dispensing a measured quantity of liquid from a storage container having flexible walls; a liquid measuring chamber forming a dispensing outlet extension of the container, said chamber having first, second and third openings and communicating with said container through said second opening, said first and third openings being oppositely disposed in the chamber wall, and first and second valve means respectively closing said first and second openings in the normal, non-dispensing condition of said apparatus; said first valve means comprising a ring rotatably carried by and within the chamber and having a fourth opening which is selectively alignable with the first opening in said chamber wall; a projection carried by said rotatable ring and extending outwardly through the third opening in the wall of said chamber to provide means for rotating said ring, air valve means mounted within said projection to permit ingress and egress of air during the operation of the apparatus, said second valve means being positioned relative to said second opening so that the application of inward pressure to said flexible walls of the container will force said second valve means away from said second opening through the application of liquid pressure against the former, whereby liquid from said container may be forced into said chamber; withdrawal of said pressure resulting in the return of said second valve means to its original position closing said second opening; the liquid in said chamber being dispensable from said chamber upon said rotatable ring means being operated to align said first and fourth openings.

4. Apparatus as defined in claim 3 wherein said second valve means is spring biased into its normal, non-dispensing position closing said second opening.

References Cited in the file of this patent

UNITED STATES PATENTS

| 1,382,138 | Stafford | June 21, 1921 |
| 1,869,808 | Hancock | Aug. 2, 1932 |
| 2,659,518 | Donnelly | Nov. 17, 1953 |
| 2,801,032 | Hall | July 30, 1957 |
| 2,828,893 | Stewart et al. | Apr. 1, 1958 |
| 2,876,935 | Lindberg | Mar. 10, 1959 |

FOREIGN PATENTS

| 1,051,890 | France | Sept. 23, 1953 |